J. T. & G. METCALFE.
GASOLENE SPRAY OR VAPORIZER VALVE.
APPLICATION FILED MAR. 31, 1911.

1,034,273.

Patented July 30, 1912.

WITNESSES

INVENTORS
JOHN T. METCALFE
GARFIELD METCALFE
BY

ATTORNEYS

UNITED STATES PATENT OFFICE.

JOHN T. METCALFE AND GARFIELD METCALFE, OF QUINCY, PENNSYLVANIA, ASSIGNORS TO QUINCY ENGINE COMPANY, OF QUINCY, PENNSYLVANIA, A CORPORATION OF PENNSYLVANIA.

GASOLENE SPRAY OR VAPORIZER VALVE.

1,034,273. Specification of Letters Patent. Patented July 30, 1912.

Application filed March 31, 1911. Serial No. 618,146.

*To all whom it may concern:*

Be it known that we, JOHN T. METCALFE and GARFIELD METCALFE, citizens of the United States, and residents of Quincy, in the county of Franklin, State of Pennsylvania, have invented a new and useful Improvement in Gasolene Spray or Vaporizer Valves, of which the following is a specification.

Our invention is an improvement in a gasolene spray or vaporizer valve, and consists in certain novel constructions and combinations of parts hereinafter described and claimed.

The object of the invention is to provide a device of the character specified, especially adapted to automatically regulate the fuel charge for explosion engines, both as regards the amount and relative proportion of ingredients of the mixture in accordance with the conditions to be met.

Figure 1:
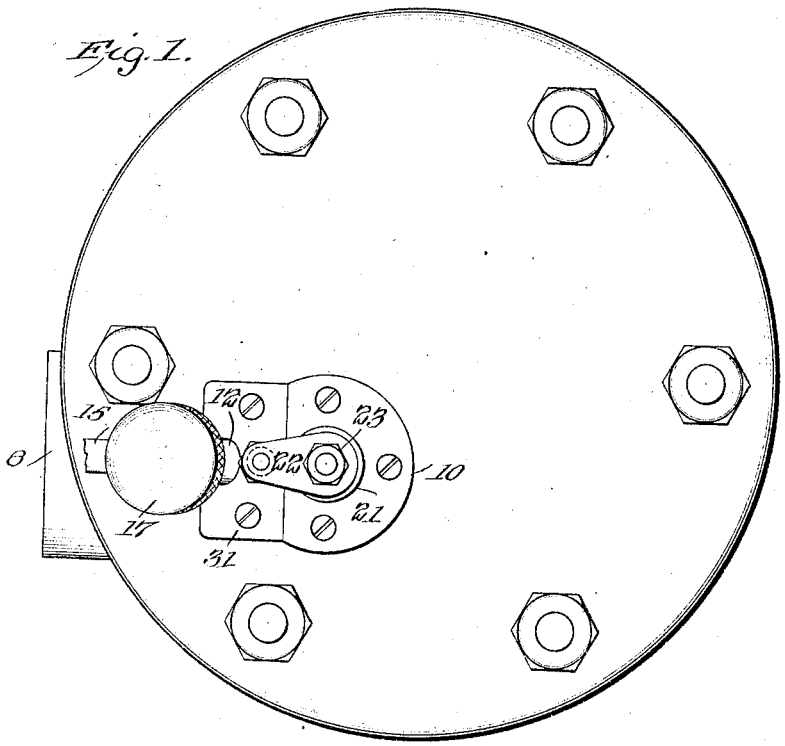
Figure 2:
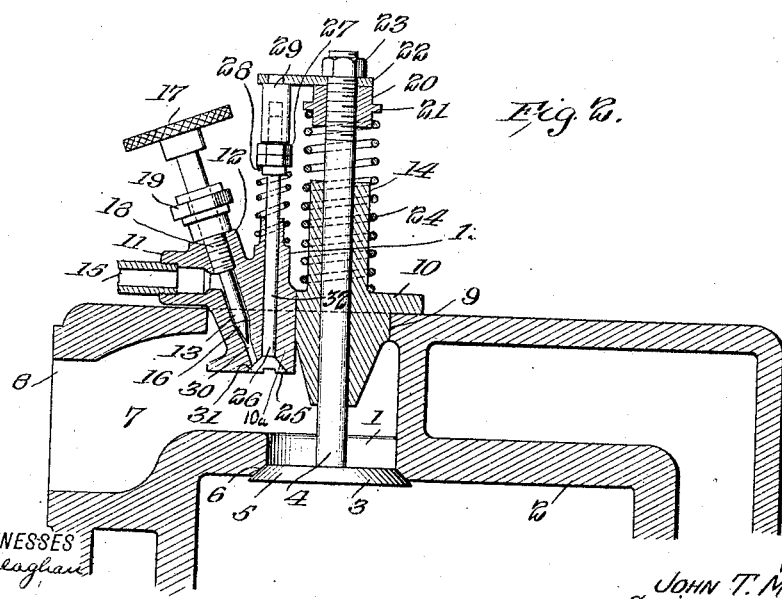

Referring to the drawings forming a part hereof: Figure 1 is a plan view of the valve; and Fig. 2 is a longitudinal section.

In the present embodiment of the invention the inlet port 1 of the engine 2 is normally closed by a valve 3, opening inwardly, and provided with a stem 4. The valve is a disk valve as shown, having a beveled edge 5 which fits a similarly shaped seat 6 at the inner end of the port.

A chamber 7 is arranged adjacent to the port and communicating therewith, and an air inlet port 8 places the chamber in communication with the atmosphere.

The engine cylinder head casing is provided with an opening 9, in which are set the inlet valve guide 10, and the spray body 10ª, to be described. The said guide 10 is provided with a nipple 14 and the spray body 10ª is provided with a valve passage, and with three nipples 11, 12 and 13. The nipples 11 and 12 communicate with the valve passage 30, and the said passage 30 opens into a tapering seat 31 at the inner end of the bore 32 in the spray body with which the nipple 13 registers. A pipe 15 is threaded into the nipple 11, and a suitable liquid fuel feeding device supplies the fuel to the valve through the said pipe.

A needle valve 16 is provided in the nipple 12 for controlling the entrance of the fuel to the valve passage, and the stem of the valve is provided with a milled head 17 for turning the valve. The stem of the valve is also provided with an enlarged threaded portion 18 engaging the nipple for moving the valve longitudinally when the stem is turned, and the valve is held in adjusted position by a lock and packing nut 19.

A nut 20 provided with an annular rib or flange 21 is threaded onto the stem 4, and an arm 22 is provided with an opening for receiving the stem and is held against the nut 20 by a nut 23. A spring 24 encircles the nipple 14 and the nut 20, and bears at one end against the flange 21 and at the other against the face of the plate 10 and acts to hold the valve 3 seated.

The passage of the fuel from the valve passage to the chamber 7 is controlled by a valve 25 having a stem 26 which extends through the nipple 13. Nuts 27 are threaded onto the stem 26, and a spring 28 encircles the nipple and stem, bearing at one end against the nipple and at the other against the nuts 27.

A sleeve or socket 29 is connected with the arm 22, and the end of the stem 26 is received loosely in the sleeve or socket. The spring 28 normally holds the valve 25 closed, and the valve is opened by the engagement of the sleeve or socket and stem. It will be observed that there is some space or clearance between the end of the sleeve and the nuts 27, so that the sleeve may move slightly toward the engine without touching the valve stem. This clearance permits both valves 3 and 25 to seat without interference from the other, and also provides that the valve 3 will open before the valve 25 is unseated. The valve 16 is set to admit the proper amount of gasolene under average or ordinary conditions, and the valve 25 controls the amount admitted to the cylinder, to meet conditions as they arise.

In operation, when the piston of the engine moves inwardly the suction opens the valve 3. Just after the valve is opened the arm 22 engages the stem of the valve 25 and opens the said valve. The cylinder now draws in a mixture of gasolene and air and the gasolene is thoroughly vaporized as it enters. The passage 30 for the gasolene opens obliquely to the stem 26 and directly toward the port 1. The greater the suction exerted by the piston, the larger will be the amount of mixture or charge taken into the cylinder. The proportion of gasolene entering into the mixture may be regulated by the nuts 27. When the said nuts are moved upwardly it is obvious that the socket will engage the nuts quicker than when they are moved downwardly and will move the valve stem a further distance, thus opening the valve to a greater extent. When the said nuts are moved downwardly, the extent of opening is lessened. The proportion of air entering into the mixture, and the aggregate amount of the charge may be regulated by the spring 24. The stronger the spring, the greater the suction required to open the valve, and the lesser will be the aggregate amount of the charge.

We claim:

1. A device of the character specified, comprising in combination with the engine cylinder having a chamber on the head thereof for the mixture provided with an inlet for air opening directly into the said chamber, and an inlet port leading from the chamber to the engine cylinder, of a valve for the port, said valve opening inwardly toward the engine cylinder, a stem for the valve extending outside of the chamber, a laterally extending arm on the stem, a spring normally holding the valve to its seat, the cylinder head having a passage for the gasolene opening into the chamber, a needle valve at the inlet of the said passage, a valve at the outlet and opening toward the engine cylinder, a stem for the valve, a spring normally holding the valve closed, and means on the lateral arm for engaging the stem of the valve at the outlet to open the valve after the inlet valve of the cylinder is unseated.

2. A device of the character specified, comprising in combination with the engine cylinder having a chamber on the head thereof for the mixture, said chamber having a lateral inlet for air opening directly into the chamber and an inlet port leading from the chamber to the engine cylinder, said chamber having an opening registering with the inlet port, a valve stem guide and a spray body seated in said opening, the guide being in alinement with the port, and the spray body being lateral with respect to the guide, a valve for the port, said valve opening inwardly toward the engine cylinder, a stem for the valve extending through the valve guide outside of the chamber, a laterally extending arm on the stem, a spring normally holding the valve to its seat, the spray body having a valve passage for the fuel opening into the chamber, a needle valve controlling the inlet of the said passage, said body having a tapering seat at the inner end of the passage, the passage opening on the seat eccentric to the seat, a tapering valve coöperating with the seat, a stem for the valve, a spring encircling the stem and bearing at one end against the spray body, nuts threaded on to the stem and engaging the other end of the spring, and a socket connected with the arm for engaging the nuts to open the valve, said socket having an opening for receiving the end of the stem.

3. A device of the character specified, comprising in combination with the engine cylinder having a chamber on the head thereof for the mixture, said chamber having a lateral inlet for air opening directly into the chamber and an inlet port leading from the chamber to the engine cylinder, said chamber having an opening registering with the inlet port, a valve stem guide and a spray body seated in said opening, the guide being in alinement with the port, and the spray body being lateral with respect to the guide, a valve for the port, said valve opening inwardly toward the engine cylinder, a stem for the valve extending through the valve guide outside of the chamber, a laterally extending arm on the stem, a spring normally holding the valve to its seat, the spray body having a valve passage for the fuel opening into the chamber, a needle valve controlling the inlet of the said passage, said body having a tapering seat at the inner end of the passage, the passage opening on the seat eccentric to the seat, a tapering valve coöperating with the seat, and a stem for the said tapering valve in position for engagement by the laterally extending arm of the stem.

4. A device of the character specified, comprising in combination with the engine cylinder having a chamber on the head thereof for the mixture, said chamber having a lateral inlet for air opening directly into the chamber, and an inlet port leading from the chamber to the engine cylinder, a valve for the port, said valve opening inwardly toward the cylinder, a stem for the valve extending outside of the chamber, said chamber having a valve passage for the fuel opening into the chamber, a valve controlling the inlet of the said passage, the chamber having a tapering seat at the inner end of the valve passage, the said passage opening on to the seat eccentric thereto, a tapering valve coöperating with the seat, a spring normally holding the valve closed, a stem on the valve, and an arm on the stem of the inlet valve for engaging the stem of the last-named valve to open the said valve after the inlet valve begins to open.

JOHN T. METCALFE.
GARFIELD METCALFE.

Witnesses:
R. B. HUNSECKER.
I. C. WALK.